United States Patent [19]

McCready

[11] Patent Number: 4,552,950

[45] Date of Patent: Nov. 12, 1985

[54] POLYETHERIMIDE ESTERS

[75] Inventor: Russell J. McCready, Mt. Vernon, Ind.

[73] Assignee: General Electric Company, Pittsfield, Mass.

[21] Appl. No.: 691,029

[22] Filed: Jan. 11, 1985

[51] Int. Cl.$^4$ .................... C08G 69/08; C08G 69/44
[52] U.S. Cl. .................... 528/292; 525/33; 525/43; 525/437; 528/296
[58] Field of Search .................... 525/33, 43, 437; 528/292, 296

[56] References Cited

U.S. PATENT DOCUMENTS

| | | | |
|---|---|---|---|
| 3,236,895 | 2/1966 | Lee | 260/584 |
| 3,274,159 | 9/1966 | Kluber | 260/75 |
| 3,355,427 | 11/1967 | Loncrini | 260/47 |
| 3,461,136 | 8/1969 | Pruckmayr | 260/326 |
| 3,555,113 | 1/1971 | Sattler | 260/858 |
| 3,654,370 | 4/1972 | Yeakey | 260/584 |
| 3,695,929 | 10/1972 | Sattler | 428/383 |
| 3,975,880 | 8/1976 | Suzuki | 528/289 |
| 3,994,853 | 11/1976 | Hindersinn et al. | 525/33 X |
| 4,016,330 | 4/1977 | Laganis | 525/33 X |
| 4,127,558 | 11/1978 | Osada et al. | 260/33.2 |
| 4,230,888 | 10/1980 | Foy et al. | 528/408 |
| 4,307,226 | 12/1981 | Bolon et al. | 528/288 |
| 4,321,341 | 3/1982 | Neuberg et al. | 528/296 X |
| 4,331,786 | 5/1982 | Foy et al. | 528/408 |
| 4,361,680 | 11/1982 | Borg et al. | 525/420 |
| 4,362,861 | 12/1982 | Shen | 528/289 |
| 4,371,692 | 2/1983 | Wolfe, Jr. | 528/289 |
| 4,390,686 | 6/1983 | Janssen et al. | 528/289 |
| 4,438,240 | 3/1984 | Tanaka et al. | 525/437 X |
| 4,483,975 | 11/1984 | de Jong et al. | 528/288 |
| 4,503,197 | 3/1985 | Speranza et al. | 525/437 |

FOREIGN PATENT DOCUMENTS 1466708 1/1966 France .
1551605 1/1968 France .

OTHER PUBLICATIONS

Honore, P. et al., "Synthesis and Study of Various Reactive Oligomers and of Poly(Ester-Imide-Ether)s" European Polymer Journal V16, pp. 909–916, 10/12/79.

Texaco Chemical Company, "Jeffamine ® Polyoxypropyleneamines" 1978.

"Polyimides" Encyclopedia of Chemical Technology 1971 Supp. vol. 1, pp. 740–773.

Primary Examiner—Lucille M. Phynes
Attorney, Agent, or Firm—Edward K. Welch, II; William F. Muffatti; John W. Harbour

[57] ABSTRACT

Polyetherimide esters are prepared from low molecular weight diols and polyoxyalkylene diimide diacids or the reactants therefore. These compositions are suitable for use in hot melt adhesives.

20 Claims, No Drawings

POLYETHERIMIDE ESTERS

Thermoplastic copolyester adhesives are well known having been described in numerous patents including for example, U.S. Pat. Nos. 3,832,314; 3,932,326; 4,062,907; 4,130,603 and 4,145,335. These are all based on segmented copolyetheresters having long chain ether-ester units and short chain ester units, alone or blended with a low molecular weight thermoplastic resin. Additional hot melt adhesive compositions have been prepared based on polyester amides, see e.g. U.S. Pat. No. 4,254,254.

Thermoplastic polyetherester imides are known having been described in U.S. Pat. No. 4,371,692. These polymers are the reaction product of a diol, a polyoxyalkylene glycol and a diimide diacid which is the reaction product of an aromatic diamine and trimellitic anhydride. These polymers are used as coating materials for cable, belts and hoses.

A new class of polymers containing polyoxyalkylene diimide diacid segments has been found. These polymers are especially useful as hot melt adhesives.

SUMMARY OF THE INVENTION

The present invention is directed to thermoplastic elastomeric polyetherimide esters comprising the reaction product of one or more diols and one or more polyoxyalkylene diimide diacids. These novel polymers may generally be represented by the formula:

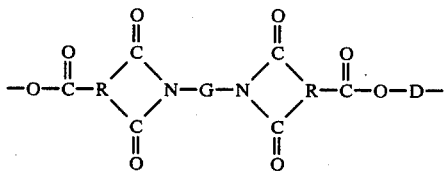

where each R is independently a trivalent organic radical, preferably a $C_2$ to $C_{20}$ aliphatic, aromatic or cycloaliphatic trivalent organic radical; G is the radical remaining after removal of the terminal (or as nearly terminal as possible) amino groups of a long chain alkylene ether diamine having an average molecular weight of from about 600 to about 12000, preferably from about 900 to about 4000; and D is the radical remaining after removal of the hydroxy groups of a low molecular weight diol.

These compositions are believed to be capable of a number of commercial applications and are especially suited for use in hot melt adhesives.

DETAILED DESCRIPTION

The novel polymers of the present invention comprise the reaction product of one or more low molecular weight diols and a diimide diacid. These are generally represented by repeating structural units of the following formula:

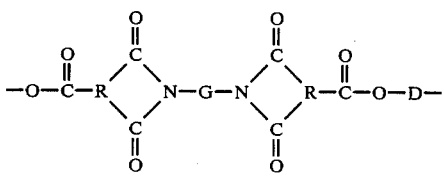

wherein each R is independently a trivalent organic radical; G is the radical remaining after removal of the terminal (or as nearly terminal as possible) amino groups of a long chain alkylene ether diamine and D is the radical remaining after removal of the terminal hydroxy group of a low molecular weight diol.

Diols suitable for use in preparing the compositions of the present invention include saturated and unsaturated aliphatic and cycloaliphatic dihydroxy compounds as well as aromatic dihydroxy compounds. These diols are preferably of a low molecular weight, i.e. having a molecular weight of about 300 or less. When used herein, the term "diols" and "low molecular weight diols" should be construed to include equivalent ester forming derivatives thereof, provided, however, that the molecular weight requirement pertains to the diol only and not to its derivatives. Exemplary of ester forming derivatives there may be given the acetates of the diols as well as for example ethylene oxide or ethylene carbonate for ethylene glycol.

Preferred saturated and unsaturated aliphatic and cycloaliphatic diols are those having from about 2 to 19 carbon atoms. Exemplary of these diols there may be given ethylene glycol; propanediol; butanediol; pentanediol; 2-methyl propanediol; 2,2-dimethyl propanediol; hexanediol; decanediol; 1,2-, 1,3- and 1,4- dihydroxy cyclohexane; 1,2-, 1,3- and 1,4-cyclohexane dimethanol; butenediol; hexenediol; etc. Especially preferred are 1,4-butanediol and mixtures thereof with hexanediol or butenediol, most preferably 1,4-butanediol.

Aromatic diols suitable for use in the practice of the present invention are generally those having from 6 to about 19 carbon atoms. Included among the aromatic dihydroxy compounds are resorcinol; hydroquinone; 1,5-dihydroxy napthalene; 4,4'-dihydroxy diphenyl; bis(p-hydroxy phenyl)methane and 2,2-bis(p-hydroxy phenyl)propane.

Especially preferred diols are the saturated aliphatic diols, mixtures thereof and mixtures of a saturated diol(s) with an unsaturated diol(s), wherein each diol contains from 2 to about 8 carbon atoms. Where more than one diol is employed, it is preferred that at least about 60 mole %, based on the total diol content, be the same diol, most preferably at least 80 mole %. As mentioned above, the preferred compositions are those in which 1,4- butanediol is present in a predominant amount, most preferably when 1,4-butanediol is the only diol.

Polyoxyalkylene diimide diacids suitable for use herein are high molecular weight diimide diacids wherein the average molecular weight is greater than about 700, most preferably greater than about 900. They may be prepared by the imidization reaction of one or more tricarboxylic acid compounds containing two vicinal carboxyl groups or an anhydride group and an additional carboxyl group, which must be esterifiable and preferably is nonimidizable, with a high molecular weight polyoxylalkylene diamine. These polyoxyalkylene diimide diacids and processes for their preparation are more fully disclosed in applicant's copending U.S. patent application Ser. No. 665,192, filed Oct. 26, 1984 entitled "High Molecular Weight Diimide Diacids and Diimide Diesters of Tricarboxylic Anhydrides", incorporated herein by reference.

In general, the polyoxyalkylene diimide diacids useful herein may be characterized by the following formula:

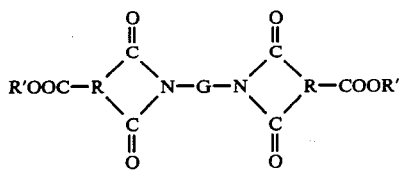

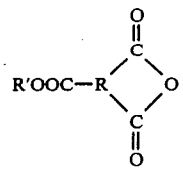

III wherein each R is independently a trivalent organic radical, preferably a $C_2$ to $C_{20}$ aliphatic, aromatic or cycloaliphatic trivalent organic radical; each R' is independently hydrogen or a monovalent organic radical preferably selected from the group consisting of $C_1$ to $C_6$ aliphatic and cycloaliphatic radicals and $C_6$ to $C_{12}$ aromatic radicals, e.g. benzyl, most preferably hydrogen; and G is the radical remaining after the removal of the terminal (or as nearly terminal as possible) amino groups of a long chain alkylene ether diamine having an average molecular weight of from about 600 to about 12000, preferably from about 900 to about 4000, and a carbon-to-oxygen ratio of from about 1.8 to about 4.3.

Representative long chain ether glycols from which the polyoxyalkylene diamine is prepared by amination include poly(ethylene ether)glycol; poly(propylene ether)glycol; poly(tetramethylene ether)glycol; random or block copolymers of ethylene oxide and propylene oxide, including propylene oxide terminated poly(ethylene ether)glycol; and random or block copolymers of tetrahydrofuran with minor amounts of a second monomer such as ethylene oxide, propylene oxide, and methyl tetrahydrofuran. Polyformal glycols prepared by reacting formaldehyde with diols such as 1,4-butanediol and 1,5-pentanediol are also useful. Especially preferred poly(alkylene ether)glycols are poly(tetramethylene ether)glycol, poly(propylene ether) glycol and poly(ethylene ether)glycols end capped with poly(propylene ether)glycol and/or propylene oxide.

In general, the polyoxyalkylene diamines useful within the scope of the present invention will have an average molecular of from about 600 to 12000, preferably from about 900 to about 4000.

The tricarboxylic component may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable and preferably is substantially nonimidizable.

While trimellitic anhydride is preferred as the tricarboxylic component, any of a number of suitable tricarboxylic acid constituents will occur to those skilled in the art including 2,6,7 naphthalene tricarboxylic anhydride; 3,3',4 diphenyl tricarboxylic anhydride; 3,3',4 benzophenone tricarboxylic anhydride; 1,3,4 cyclopentane tricarboxylic anhydride; 2,2',3 diphenyl tricarboxylic anhydride; diphenyl sulfone-3,3',4 tricarboxylic anhydride, ethylene tricarboxylic anhydride; 1,2,5 naphthalene tricarboxylic anhydride; 1,2,4 butane tricarboxylic anhydride; diphenyl isopropylidene 3,3',4 tricarboxylic anhydride; 3,4 dicarboxyphenyl 3'-carboxylphenyl ether anhydride; 1,3,4 cyclohexane tricarboxylic anhydride; etc. These tricarboxylic acid materials can be characterized by the following formula:

where R is a trivalent organic radical, preferably a $C_2$ to $C_{20}$ aliphatic, aromatic, or cycloaliphatic trivalent organic radical and R' is preferably hydrogen or a monovalent organic radical preferably selected from the group consisting of $C_1$ to $C_6$ aliphatic and/or cycloaliphatic radicals and $C_6$ to $C_{12}$ aromatic radicals, e.g. benzy; most preferably hydrogen.

Briefly, these polyoxyalkylene diimide diacids may be prepared by known imidization reactions including melt synthesis or by synthesizing in a solvent system. For example, the diimide diacid may be prepared by reacting 2 moles of the tricarboxylic component per mole of polyoxyalkylene diamine by refluxing at between about 100° C. to 300° C., preferably 150° C. to 250° C., in a suitable solvent such as dimethylformamide, diethylformamide, diethylacetamide, N-methylcaprolactam, or dimethylsulfoxide, among others known to those skilled in the art, or in an azeotropic mixture of said solvent with an additional inert solvent, e.g. xylene. The solvent is subsequently removed by distillation and the residual solvent removed by vacuum drying to leave the diimide diacid. Alternatively the diimide diacid may be prepared by melt synthesis wherein the tricarboxylic component and the diamine are heated at between 100° C. to 300° C., Preferably 150° C. to 250° C., while drawing off water, for several hours to produce the diacid. Finally, if the diimide diester is to be used, these may conveniently be prepared by heating about 2 moles of the tricarboxylic component per mole of diamine in an excess of the low molecular weight diol to be used in the polymer ultimately desired. The reaction mixture should contain an esterification catalyst, such as a titanate ester. The reaction is completed by boiling while slowly removing distillate to insure that esterification is completed. Preparation of the diimide diacid or their esters is not meant to be limited to the procedure just described which are illustrative of synthetic methods known in the art.

The polymers of the present invention can be prepared readily by melt condensation procedures. Typically, the procedure involves the reaction in the presence of a titanate catalyst of a polyoxyalkylene diimide diacid or an ester thereof with a low molecular weight diol, the latter being present in a molar excess. Initially, reaction takes place at about atmospheric pressure while the temperature is increased up to about 240°–300° C. while distilling off volatiles. The resulting prepolymer of relatively low molecular weight can be converted to a high molecular weight polymer by continuing the reaction at 240°–300° C. at reduced pressures, preferably less than 670 Pa and more preferably at less than 250 Pa.

The typical procedure for the preparation of the polymers of the present invention can be varied widely. For example, as an alternative to the foregoing procedure, it is also possible to directly charge the reactor system with the polyoxyalkylene diimide diacid reactants rather than preform the diimide diacid.

Specifically, when preparing the polymers of this invention by the procedure in which the diimide diacid or ester thereof is formed during the course of the melt condensation, the tricarboxylic component and the polyoxyalkylene diamine are charged in place of the preformed diimide diacid or its ester along with the other ingredients. From then on, the melt condensation is conducted in substantially the same manner as previously described. In theory, two moles of tricarboxylic component react with one mole of diamine; however, when the diimide diacid is prepared in the presence of the low molecular weight diol, a minor amount of tricarboxylic component may react with available hydroxyl groups and ultimately function as a branching agent in the finished polymer. Within limits, the degree of branching in the finished polymer can be controlled by varying the mole ratio of tricarboxylic component to diamine. An excess of diamine reduces the degree of branching, while an excess of the tricarboxylic component increases branching. Ratios of 2 moles of tricarboxylic component to 0.85-1.15 moles of diamine have been found to yield useful polymers. In addition to controlling branching by varying the tricarboxylic component/diamine mole ratio, one can compensate for branching by introducing a monofunctional reactant such as benzoic acid in minor amounts.

With reference to branching, it should be noted that polymers of this invention, when prepared from preformed diimide diesters, are substantially free of branching. If branching is desired, one needs only to introduce a branching agent, such as trimellitic anhydride, along with the preformed diimide diester. The amount of branching agent generally will be less than 0.15 moles per mole of diimide diacid or ester thereof. Useful branching agents other than trimellitic anhydride include trimethyl trimellitate, glycerol, trimethyl propane, trimesic acid and its esters and the like.

In general, the novel polyetherimide esters described herein may be prepared by conventional esterification/condensation reactions for the production of polyesters. Exemplary of the processes that may be practiced are as set forth in, for example, U.S. Pat. Nos. 3,023,192; 3,763,109; 3,651,014; 3,663,653 and 3,801,547, herein incorporated by reference.

It is customary and preferred to utilize a catalyst in the process for the production of the polyetherimide esters of the present invention. In general, any of the known ester-interchange and polycondensation catalysts may be used. Although two separate catalysts or catalyst systems may be used, one for ester interchange and one for polycondensation, it is preferred, where appropriate, to use one catalyst or catalyst system for both. In those instances where two separate catalysts are used, it is preferred and advantageous to render the ester-interchange catalyst ineffective following the completion of the precondensation reaction by means of known catalyst inhibitors or quenchers, in particular, phosphorus compounds such as phosphoric acid, phosphenic acid, phosphonic acid and the alkyl or aryl esters or salts thereof, in order to increase the thermal stability of the resultant polymer.

Exemplary of the suitable known catalysts there may be given the acetates, carboxylates, hydroxides, oxides, alcoholates or organic complex compounds of zinc, manganese, antimony, cobalt, lead, calcium and the alkali metals insofar as these compounds are soluble in the reaction mixture. Specific examples include, zinc acetate, calcium acetate and combinations thereof with antimony tri-oxide and the like. These catalysts as well as additional useful catalysts are described in U.S. Pat. Nos. 2,465,319; 2,534,028; 2,850,483; 2,892,815; 2,937,160; 2,998,412; 3,047,539; 3,110,693 and 3,385,830, among others, incorporated herein by reference.

Where the reactants and reactions allow, it is preferred to use the titanium catalysts including the inorganic and organic titanium containing catalysts, such as those described in, for example, 2,720,502; 2,727,881; 2,729,619; 2,822,348; 2,906,737; 3,047,515; 3,056,817; 3,056,818; and 3,075,952 among others, incorporated herein by reference. Especially preferred are the organic titanates such as tetra-butyl titanate, tetra-isopropyl titanate and tetra-octyl titanate and the complex titanates derived from alkali or alkaline earth metal alkoxides and titanate esters, most preferably the organic titanates. These too may be used alone or in combination with other catalysts such as for example, zinc acetate, calcium acetate, manganese acetate or antimony trioxide, and/or with a catalyst quencher as described above. The catalyst should be present in amounts of from about 0.005 to 2.0 percent by weight based on the total reactants.

Both batch and continuous methods can be used for any stage of polymer preparation. Further polymerization of lower molecular weight polymers can also be accomplished in the solid phase by heating solid polymer particles in a vacuum or in a strem of inert gas to remove liberated low molecular weight diol.

The preparation of the polymers of this invention can be carried out in the presence of an antioxidant. As well as other stabilizers including thermal and UV stabilizers. While stabilizers are not normally required on a laboratory scale, their use, particularly oxidative and/or thermal stabilizers, is preferred on a commercial scale.

Most any stabilizer known in the art for polyetherimide esters may be used including phenols and their derivatives, amines and their derivatives, compounds containing both hydroxyl and amine groups, hydroxyazines, oximes, polymeric phenolic esters and salts of multivalent metals in which the metal is in its lower valence state.

Representative phenol derivatives useful as stabilizers include 3,5-di-tert-butyl-4-hydroxy hydrocinnamic triester with 1,3,5-tris-(2-hydroxyethyl)-s-triazine-2,4,6-(1H,3H,5H)trione; N,N'-hexamethylene bis-(3,5-di-tert-butyl-4-hydroxyhydrocinnamamide 4,4'-bis(2,6-ditertiary-butylphenol); 1,3,5-trimethyl-2,4,6-tris(3,5-ditertiary-butyl-4-hydroxybenzyl)benzene and 4,4'-butylidene-bis(6-tertiary-butyl-m-cresol). Various inorganic metal salts or hydroxides can be used as well as organic complexes such as nickel dibutyl dithiocarbonate, manganous salicylate and copper 3-phenyl-salicylate. Typical amine stabilizers include 4,4-bis($\alpha,\alpha$-dimethylbenzyl)diphenylamine; N,N'-bis(beta-naphthyl)-p-phenylene diamine; N,N'-bis(1-methylheptyl) -p-phenylene diamine and either phenylbeta-naphthyl amine or its reaction products with aldehydes. Mixtures of hindered phenols with esters of thiodipropionic acid, mercaptides and phosphite esters are particularly useful. Additional stabilization to ultraviolet light can be obtained by compounding with various UV absorbers such as substituted benzophenones and/or benzotriazoles.

DETAILED DESCRIPTION OF THE PREFERRED EMBODIMENTS

The following examples are presented as illustrative of the present invention and are not to be construed as limiting thereof.

Diamide Diacid A

A polyoxyalkylene diimide diacid was prepared by the imidization of trimellitic anhydride with Texaco Chemical Company's Jeffamine ® D2000 polypropylene ether diamine, average molecular weight 2000.

EXAMPLE 1

20 parts by weight of 1,4-butanediol, 91 parts by weight Diimide Diacid A, 5 parts by a weight of phenolic stabilizer and 1 cc of titanate ester catalyst were placed into a reaction vessel and heated to 180° C. for approximately one hours. The pot temperature was then increased to about 250° C. and a vacuum applied (<1 mmHg) for about three hours. The resulting polyetherimide ester composition was tacky and had a Brookfield viscosity of 20,000 centipoise at 150° C.

EXAMPLE 2

31 parts by weight of 1,6-hexanediol, 91 parts by weight of Diimide Diacid A, 5 parts by weight of a phenolic stabilizer and 1 cc of titanate ester catalyst were placed into a reaction vessel and heated to 180° C. for approximately one hour. The pot temperature was then increased to about 250° C. and a vacuum applied (<1 mmHg) for about three hours. The resultant polyetherimide ester composition was tacky and had a Brookfield viscosity of 4375 centipoise at 150° C.

Obviously, other modifications and variations of the present invention are possible in light of the above teachings. It is therefore to be understood that changes may be made in the particular embodiments of the invention described which are within the full intended scope as defined by the appended claims.

I claim:

1. A polyetherimide ester composition comprising the reaction product of
(a) one or more low molecular weight diols, and
(b) one or more polyoxyalkylene diimide diacids.

2. The composition of claim 1 wherein the diol component (a) is selected from the group consisting of $C_2$ to $C_{19}$ aliphatic or cycloaliphatic diols, $C_6$ to $C_{19}$ aromatic diols or a mixtures of diols.

3. The composition of claim 2 wherein the diol component (a) is from about 80 to 100 mole % 1,4-butanediol.

4. The composition of claim 2 wherein the diol is 1,4-butanediol.

5. The composition of claim 1 wherein the polyoxyalkylene diimide diacid component (b) is derived from one or more polyoxyalkylene diamines and one or more tricarboxylic acid compounds containing two vicinal carboxyl groups or an anhydride group and an additional carboxyl group, and is characterized by the following formula:

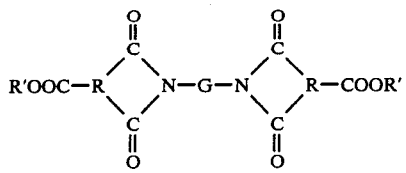

wherein each R is independently selected from the group consisting of $C_2$ to $C_{20}$ aliphatic and cycloaliphatic trivalent organic radicals and $C_6$ to $C_{20}$ aromatic trivalent organic radicals; each R' is independently selected from the group consisting of hydrogen, $C_1$ to $C_6$ aliphatic and cycloaliphatic monovalent organic radicals and $C_6$ to $C_{12}$ aromatic monovalent organic radicals, and G is the radical remaining after removal of the amino groups of a long chain alkylene ether diamine having an average molecular weight of from about 600 to 12000.

6. The composition of claim 5 wherein the polyoxyalkylene diimide diacid is such that each R is a $C_6$ trivalent aromatic hydrocarbon radical, each R' is hydrogen and G is the radical remaining after removal of the amino groups of a long chain alkylene ether diamine having an average molecular weight of from about 900 to 4000.

7. The composition of claim 1 wherein the polyoxyalkylene diimide diacid is derived from trimellitic anhydride and a polyoxyalkylene diamine selected from the group consisting of polypropylene oxide diamine and a copoly(ethylene oxidepropylene oxide)diamine having predominately polyethylene oxide in the backbone.

8. The composition of claim 1 which further contains a stabilizer.

9. The composition of claim 8 wherein the stabilizer is 3,5-di-tert-butyl-4-hydroxy hydrocinnamic triester with 1,3,5-tris-(2-hydroxy ethyl)-3-triazine-2,4,6-(1H,3H,5H)trione.

10. A polyetherimide ester composition comprising the reaction product of
(a) one or more low molecular weight diol,
(b) one or more polyoxyalkylene diamine, and
(c) one or more tricarboxylic acid component containing two vicinal carboxylgroups or an anhydride group and an additional carboxyl group.

11. The composition of claim 10 wherein the diol is selected from the group consisting of $C_2$ to $C_{19}$ aliphatic or cycloaliphatic diols, $C_6$ to $C_{19}$ aromatic diols and mixtures of diols.

12. The composition of claim 11 wherein the diol is butanediol.

13. The composition of claim 10 wherein the polyoxyalkylene diamine is represented by the following formula:

wherein G is the radical remaining after the removal of the terminal amino groups of a long chain alkylene ether diamine.

14. The composition of claim 13 wherein the long chain alkylene ether diamine had a molecular weight of from about 60 to about 12000.

15. The composition of claim 13 wherein the long chain alkylene ether diamine had a molecular weight of from about 900 to about 4000.

16. The composition of claim 13 wherein the long chain alkylene ether diamine is selected from the group consisting of poly(tetramethylene ether diamine), poly(propylene ether)diamine and co(polyethylene ether-propylene ether)glycol.

17. The composition of claim 10 wherein the tricarboxylic component is represented by the formula:

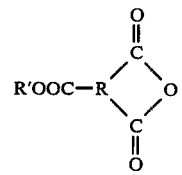

where R is $C_2$ to $C_{20}$ aliphatic, cycloaliphatic or aromatic trivalent organic radical and R' is selected from the group consisting of hydrogen and a $C_1$ to $C_6$ aliphatic or cycloaliphatic radical.

18. The composition of claim 17 wherein R' is hydrogen.

19. The composition of claim 10 wherein the tricarboxylic component is trimellitic anhydride.

20. The composition of claim 10 which further contains as stabilizer 3,5-di-tert-butyl-4-hydroxy hydrocinnamic triester with 1,3,5-tris-(2-hydroxyethyl)-3-triazine-2,4,6-(1H,3H,5H)trione.

* * * * *